US010884778B1

(12) United States Patent
Dunagan et al.

(10) Patent No.: US 10,884,778 B1
(45) Date of Patent: Jan. 5, 2021

(54) ADJUSTING DYNAMICALLY SCALABLE INSTANCE HOSTING BASED ON COMPUTE RESOURCE USAGE

(71) Applicant: Amazon Technologies, Inc., Seattle, WA (US)

(72) Inventors: John David Dunagan, Redmond, WA (US); Mohit Gupta, Seattle, WA (US); Mihir Sadruddin Surani, Seattle, WA (US); Yuxuan Liu, Kirkland, WA (US); Les Johann Lamprecht, Sammamish, WA (US); John Merrill Phillips, Seattle, WA (US); Malcolm Featonby, Sammamish, WA (US); Roberto Pentz De Faria, Cape Town (ZA); Erik Quanstrom, Vashon, WA (US); James Rigby, Seattle, WA (US); Ethan Faust, Seattle, WA (US); Wenbo Bu, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 182 days.

(21) Appl. No.: 16/147,405

(22) Filed: Sep. 28, 2018

(51) Int. Cl.
*H04L 29/08* (2006.01)
*H04M 7/00* (2006.01)
(Continued)

(52) U.S. Cl.
CPC ........ *G06F 9/45558* (2013.01); *G06F 9/5077* (2013.01); *H04L 67/10* (2013.01); *G06F 2009/45595* (2013.01)

(58) Field of Classification Search
CPC ... G06F 2009/4557; G06F 2009/45595; G06F 9/5088; G06F 9/45558; G06F 9/4856;
(Continued)

(56) References Cited

U.S. PATENT DOCUMENTS 8,825,550 B2   9/2014 Marr et al.
9,280,390 B2 * 3/2016 Sirota ................. H04L 67/10
(Continued)

FOREIGN PATENT DOCUMENTS

WO   2018/018575 A1   2/2018
WO   2018/132988 A1   7/2018

OTHER PUBLICATIONS

Campos et al., Stochastic Modeling of Auto Scaling Mechanism in Private Clouds for Supporting Performance Tuning, 6 pages (Year: 2015).*

(Continued)

*Primary Examiner* — Thuy Dao
(74) *Attorney, Agent, or Firm* — Nicholson De Vos Webster & Elliott, LLP

(57) ABSTRACT

Techniques for managing dynamically scalable virtualized compute instances within a provider network are described. A dynamically scalable instance has a baseline performance level and a maximum performance level associated with a computing resource, such as a processor, a memory, a network interface, etc. In response to receive a request to launch a dynamically scalable instance, one or more services select a computer system to host the requested instance from a pool of instance-hosting computer systems of a provider network. The instance-hosting computer systems include a monitoring agent that reports computing resource usage data to the one or more services. The one or more services monitor the resource usage of the instance-hosting computer systems and migrate instances so that the dynamically scalable instances can operate up to the maximum level of performance.

20 Claims, 7 Drawing Sheets

(51) Int. Cl.
*G06F 9/50* (2006.01)
*H04L 29/06* (2006.01)
*G06F 9/455* (2018.01)

(58) Field of Classification Search
CPC ... G06F 9/5077; G06F 19/3418; H04L 67/10; H04L 67/2842; G16H 10/60; G16H 40/67
See application file for complete search history.

(56) References Cited

U.S. PATENT DOCUMENTS

| | | | |
|---|---|---|---|
| 9,292,060 | B1 | 3/2016 | Marr et al. |
| 9,300,552 | B2* | 3/2016 | Dube ................... G06F 8/77 |
| 10,013,287 | B2* | 7/2018 | Srinivasan ........... G06F 9/5005 |
| 10,536,322 | B2 | 1/2020 | Livschitz et al. |
| 2012/0317358 | A1* | 12/2012 | Ando ................... G06F 3/0605 711/117 |
| 2014/0058871 | A1 | 2/2014 | Marr et al. |
| 2015/0207750 | A1 | 7/2015 | Birkestrand et al. |
| 2015/0347183 | A1* | 12/2015 | Borthakur ............ G06F 9/4856 718/105 |
| 2016/0261521 | A1* | 9/2016 | Certain ................ G06Q 10/00 |
| 2017/0093962 | A1 | 3/2017 | Player et al. |
| 2017/0116051 | A1* | 4/2017 | Wagner ................ G06F 9/50 |
| 2018/0287898 | A1 | 10/2018 | Bellini et al. |
| 2019/0220319 | A1 | 7/2019 | Parees et al. |
| 2019/0317788 | A1* | 10/2019 | Lang ................... G06F 9/5061 |

OTHER PUBLICATIONS

Fargo et al., Autonomic Workload and Resources Management of Cloud Computing Services, 10 pages (Year: 2014).*
Co-pending U.S. Appl. No. 13/566,802, filed Aug. 3, 2012.
Non-Final Office Action, U.S. Appl. No. 16/147,412, dated Mar. 19, 2020, 19 pages.
Notice of Allowance, U.S. Appl. No. 16/147,412, dated Aug. 19, 2020, 9 pages.

* cited by examiner

ADJUSTING DYNAMICALLY SCALABLE INSTANCE HOSTING BASED ON COMPUTE RESOURCE USAGE

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the following figures.

DETAILED DESCRIPTION

Figure 1:
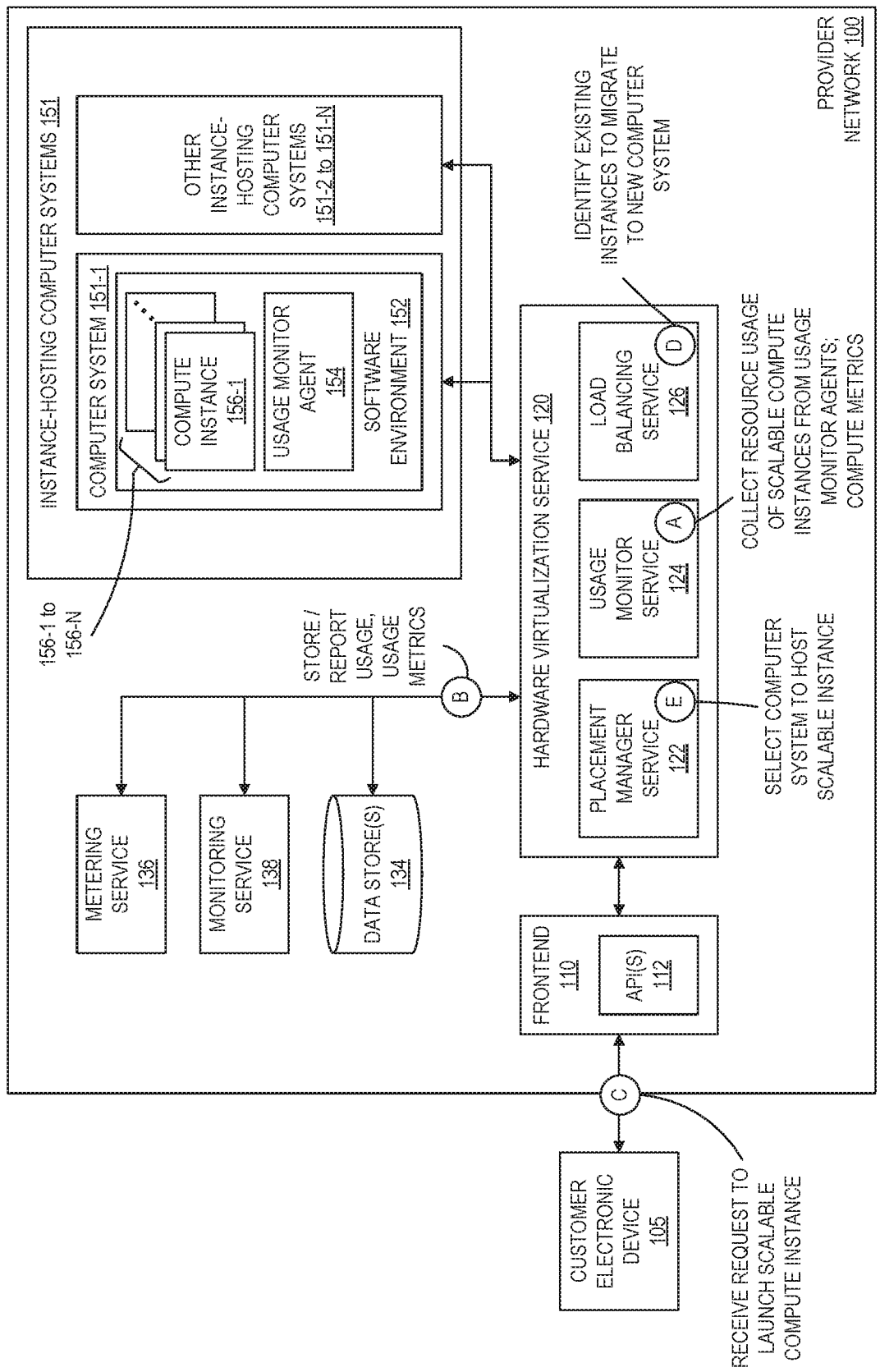
FIG. 1 is a diagram illustrating an environment for managing usage of computer system resources in a provider network according to some embodiments.

Virtualization service providers often offer a range of virtual machine or compute instances that have varying levels of performance and cost. The provider's customers can select a particular compute instance type to launch within the provider's network and configure the launched compute instance to execute the customer's software. Frequently, however, customers are unable to deterministically know their software performance requirements prior to selecting a compute instance type. As a result, some customers might overestimate their requirements and end up paying more for higher performance compute instances that idle for periods of time, while other customers might underestimate their requirements and end up with software performance bottlenecked by the performance of the selected compute instance. Additionally, some customer software may exhibit different performance requirements at different times. Some customers might execute compute intensive simulations periodically throughout the working day, while other customers might have a workload that requires a large amount of network bandwidth at certain times of the day, week, month, etc. to backup customer data to a remote storage device. These customers are forced to select higher cost, higher performance compute instances for worst-case workloads, or lower cost, lower performance compute instances that introduce performance bottlenecks during increased workloads.

To address these and other challenges, various embodiments provide approaches for providing compute instances that scale performance based on computing needs, monitoring the compute instance's actual usage of the underlying computing resources of the computer system that hosts the instance, and migrating the instance to another computer system when the overhead or excess computing resources of the computer system run low. By monitoring the actual resource usage of such dynamically scalable instances, the provider network can optimize the usage of the underlying compute resources and/or tailor compute instance performance to customer need rather than to a pre-selected performance specification. In some embodiments, a usage monitor service obtains usage information from agents monitoring compute instances' usage of the underlying computer system's resources. The monitoring agents execute on the instance-hosting computer systems and monitor per-instance resource usage of the computer system's resources (e.g., CPUs, memory, storage devices, and network interfaces) by the hosted instance(s). Based on the reported usage data, the usage monitor service can determine metrics such as per-compute instance resource usage and each instance-hosting computer system's utilization load. The metrics allow the provider network to improve the placement of dynamically scalable compute instances on the underlying compute resources, the movement of compute instances around a pool of host computer systems, and the accuracy of the cost attributed to customers based on actual usage (rather than allotted performance).

FIG. 1 is a diagram illustrating an environment for managing usage of computer system resources in a provider network 100 according to some embodiments. The provider network 100 provides customers with the ability to utilize one or more of a variety of types of computing-related resources such as executing compute instances (e.g., a virtual machine (VM)) and/or containers, executing batch jobs, executing code without provisioning servers, etc. To provide these and other computing resource services, provider networks 100 often rely upon virtualization techniques. In one embodiment, computing resources, which may be rented or leased to customers, are provided via the hardware virtualization service 120. The hardware virtualization service 120 allows multiple compute instances (e.g., VMs) of one or more customers to share the same underlying computer system in the pool of instance-hosting computer systems 151 (e.g., computer systems 151-1 through 151-N).

Customers interact with the hardware virtualization service 120 via an interface such as a frontend 110. For example, a customer electronic device 105 sends messages to and receives messages from the frontend 110 across one or more intermediate networks (e.g., the internet). Frontend 110 includes one or more application programming interfaces 112 (APIs) that enable devices, such as the customer electronic device 105, to communicate with backend services of the provider network 100, such as the hardware virtualization service 120. These API-based interactions may occur via a web-browser based interface, a command-line interface (CLI), software development kit (SDK) integrations, etc. In addition to facilitating communications with backend services, the frontend 110 may perform access control checks to verify the identity of customers and their associated permissions to backend services. Customers launch and configure compute instances according to their needs by interacting with the hardware virtualization service 120.

The instance-hosting computer systems 151 can host multiple compute instances (e.g., compute instances 156-1 to 156-N). The computer systems 151 include underlying physical components to support compute instances 156. Such components may include general purpose processors (e.g., a central processing unit (CPU)), memory (e.g., random-access memory (RAM)), special purpose processors (e.g., accelerators), block I/O storage (e.g., disk or solid-state storage drives), network interfaces, and the like. Each of these components may offer a certain level of performance, which is shared amongst one or more compute instances 156. To facilitate such sharing, the compute instances 156 operate in a software environment 152 such as a hypervisor, a hypervisor executing within a host operating system (OS), a virtual machine manager (VMM), or the like, that controls access to the underlying physical components of the computer systems 151 by the compute instances 156. The compute instances 156 execute customer software, which may include an operating system and one or more applications, some of which may be licensed by third-parties. From the perspective of a host OS within which the compute instances 156 operate, an operating system executed by a compute instance 156 may be considered a guest OS.

The hardware virtualization service 120 includes a placement manager service 122, a usage monitor service 124, and a load balancing service 126. The instance-hosting computer systems 151 include usage monitor agents 154 that report per-compute instance resource usage information to the usage monitor service 124. As indicated at the encircled letter "A," the usage monitor service 124 compiles the reported usage information and processes it to generate one or more metrics for use by other services. In some embodiments, the usage monitor service 124 stores the usage information as time-series data in a data store 134, as indicated at circle B. The usage monitor service 124 may further store the generated metrics in the data store 134 or report metrics to other services, such as a metering service 136 or monitoring service 138. Other services that use the generated metrics include the placement manager service 122 and the load balancing service 126. As described, these services perform functions to facilitate the provision of dynamically scalable compute instances by the provider network (although other service configurations are possible). For example, a customer may issue a request for the provider network 100 to launch a new dynamically scalable compute instance, as indicated at circle C. The placement manager service 122 can use the metrics to determine on which computer system 151 to launch the new dynamically scalable compute instance. As another example, the load balancing service 126 may use the metrics to identify a dynamically scalable compute instance for migration to different computer (e.g., based on a limited overhead associated with the hosting computer system or need for additional performance), as indicated at circle D. In either scenario, the placement manager service 122 evaluates the request against the state of the resource usage of the pool of instance-hosting computer systems 151 to select a computer system to host the new (or migrating) instance, as indicated at circle E.

FIG. 1 illustrates computer system 151-1 in greater detail than the other instance-hosting computer systems 151-2 to 151-N of the provider network 100. In particular, the computer system 151-1 includes a software environment 152 that hosts compute instances 156 (e.g., using the above-described virtualization techniques) and includes a usage monitor agent 154. The usage monitor agent 154 monitors the usage of the underlying components of the computer system 151 by the compute instances 156. In some embodiments, the usage information is relative to logical divisions of the underlying physical components of computer system (e.g., a single physical CPU may host multiple virtual CPUs). In one embodiment, the usage monitor agent 154 obtains per-compute instance CPU, memory, network, or other resource usage information from kernel- or hypervisor-managed data within the software environment 152. For example, a host OS may include system libraries that allow the usage monitor agent 154 to obtain per-process CPU, memory, network, etc. resource usage. A single process may represent each compute instance 156, or the usage monitor agent 154 may associate multiple processes with a particular compute instance 156 and total the resource usage of the processes to attribute to the compute instance. Usage information may be absolute (e.g., gigabytes of memory, number of input/output operations per second) or relative (e.g., percentage of CPU usage, CPU core usage, or virtual CPU usage, percentage bandwidth usage, etc.).

In some embodiments, a hypervisor and the usage monitor agent 154 are executed within an operating system environment executed on one or more processors of the computer system 151. In some embodiments, the usage monitor agent 154 is part of the hypervisor. In some embodiments, the compute instances 156 are executed by the same one or more processors executing the hypervisor and usage monitor agent 154. In other embodiments, the compute instances 156 are executed by a separate one or more processors than the one or more processors executing the hypervisor and/or usage monitor agent 154. One or more software drivers handle communications between the separated processors and facilitate the collection of resource usage information by the usage monitor agent 154.

In embodiments where the compute instances 156 are executing using the same physical computing resources (e.g., CPU, RAM, etc.) of a computer system 151 as the virtualization management software (e.g., hypervisor, VMM, host OS), the usage monitor agent 154 may further report the resource usage by the virtualization management software to the usage monitor service 124 (e.g., the software environment 152 less the resource usage of compute instances 156).

Once the usage monitor agent 154 has obtained per-compute instance usage values of one or more of the underlying physical components of a computer system 150, the usage monitor agent 154 sends or vends the usage information to a usage monitor service 124 (e.g., by making an API call to the usage monitor service 124 or by making an API available that the usage monitor service 124 can query to obtain the usage information). In one embodiment, the usage monitor service 124 provides a report API function through which usage monitor agents 154 of computer systems 151 report usage information to the usage monitor service 124.

In some embodiments, usage information is transferred from the usage monitor agent 154 to the usage monitor service 124 at some predetermined interval (e.g., approximately every minute, every five minutes, etc.) forming time series data. Depending on the length of the interval, the usage monitor agent may collect multiple samples of usage information of the resources and send an average of the samples to the usage monitor service 124. For example, if the interval is one minute and the usage monitor service 124 is obtaining point-in-time usage information, the usage monitor service 124 may sample usage information multiple times during the minute interval and average the samples before sending the usage information to the usage monitor service 124. In some embodiments, the usage monitor service 124 may randomly assign a start time or an offset within an interval to each of the usage monitor agents 154 associated with computer systems 150A-150N to distribute the timing of the transfers of usage information from each of the usage monitor agents 154 to the usage monitor service 124. Although illustrated within the software environment 152, in some embodiments, the usage monitor agent 154 is a software application executing alongside the software environment 152 and the compute instances 156 and in communication with the software environment 152 and/or the compute instances 156.

The usage monitor service 124 compiles the obtained usage information from the various usage monitor agents. Such data may include the reported utilization of each resource by each instance at each interval across each of the instance-hosting computer systems 151 reporting usage information. The data may be in terms of physical computing resource usage (e.g., % usage of a CPU, a CPU core, total memory footprint, etc.) or a logical computing resource usage (e.g., % usage of a virtual CPU, % usage of a virtual network interface, etc.). The usage monitoring service 124 processes the obtained data to generate various metrics that may be used by other services of the provider network 100.

For example, the usage monitoring service 124 processes the raw usage information to generate representative per-resource metrics of the per-instance and/or per-computer system usage for given periods of time to other services of the provider network 100. If the reported time series data is in logical computing resource units, the usage monitoring service 124 may convert the data to physical computing resource usage based on the logical configuration of the instance and the physical configuration of the host computer system. In some embodiments, the usage monitoring service 124 stores the obtained usage information and/or the calculated metrics in a data store 134, which may be a database provided by a database service (not shown) of the provider network 100, such as a relational or a non-relational (e.g., "NoSQL") database, a distributed or non-distributed database, etc. In some embodiments, the usage monitoring services 124 offers an API through which one or more other provider network services (e.g., services 122, 126, 138) can obtain resource usage information or metrics. Additional details regarding the usage monitor service 124 are provided in FIG. 2 and the associated description.

In some embodiments, a placement manager service 122 uses one or more of the metrics generated by the usage monitoring service 124 to identify computer systems 151 to host a dynamically scalable compute instance 156 (whether being launched or moved from another computer system). For example, the placement manager service 122 selects a computer system 151 to host a new compute instance based on a launch request received from a customer at the frontend 110. Indications of the received launch request may be sent from the frontend 110 to the placement manager service 122 or the hardware virtualization service 120. As another example, the placement manager service 122 may select a computer system 151 based on a request from the load balancing service 126 for situations where an existing compute instance 156 is to be moved from one computer system 151 to another computer system 151. To make these selections, the placement manager service 122 obtains per-computer system 151 resource usage information metrics from the usage monitor service 124. Additional details regarding the usage monitor service 124 are provided in FIG. 3 and the associated description.

In some embodiments, a load balancing service 126 uses one or more of the metrics generated by the usage monitoring service 124 to balance the resource usage of dynamically scalable compute instances across the instance-hosting computer systems 151. The load balancing service 126 periodically evaluates one or more metrics from the usage monitoring service 124 to identify computer systems 151 hosting compute instances 156 that are consuming a large amount of the maximum performance of one or more resources of the computer system. Once the load balancing service has identified the computer systems 151 exhibiting the highest degree of usage, the load balancing service 126 causes one or more of the compute instances 156 running on those identified computer systems 151 for migration. In some embodiments, the load balancing service 126 queries the placement manager service 122 to find low-usage computer systems 151 as targets for instance migration and may further initiate the migration of an instance from one computer system to another computer system. Additional details regarding the load balancing service 126 are provided in FIG. 4 and the associated description.

In some embodiments, a metering service 136 uses one or more of the metrics generated by the usage monitoring service 124 to determine how much to charge the customer for hosting a compute instance of a particular dynamically scalable instance type. A dynamically scalable instance type may offer a baseline performance level associated with one or more computing resources (e.g., a processor, a memory, local storage, a network interface, etc.) and a maximum performance level associated with the computing resources. For example, one dynamically scalable instance type may offer a baseline performance level of 10% virtual CPU (vCPU) usage of each of two vCPUs with a maximum performance level of 100% usage of the two vCPUs, another dynamically scalable instance type may offer a baseline performance level of 20% virtual CPU (vCPU) usage of each of four vCPUs with a maximum performance level of 100% usage of four vCPUs, etc. Other computing resources such as memory, storage, network interfaces, hardware accelerators, etc. may be characterized with a baseline performance level and a maximum performance level (e.g., a 1 GB memory footprint at a baseline performance level with a 4 GB memory footprint at a maximum performance level; a 2 Mb/s network bandwidth at a baseline performance level with a 10 Mb/s network bandwidth at a maximum performance level, etc.). The metering service 136 obtains metrics related to a customer's compute instance's resource consumption over a time period (e.g., a day). If the actual resource usage over the time period does not exceed the baseline performance level, the customer's cost for the dynamically scalable instance is a baseline rate. If the actual resource usage over the time period exceeds the baseline performance level, the metering service 136 applies an additional rate to the resource usage in excess of the baseline rate. In some embodiments, the additional rate scales linearly as the resource consumption scales from the baseline performance level to the maximum performance level.

In some embodiments, the usage monitor service 124 sends information related to the resource usage of a compute instance to a monitoring service 138. Based on the information, the monitoring service 138 may send alerts to the customer associated with a compute instance. Such alerts may be used to alert the customer that a compute instance has operated above the baseline rate for some user-specified or predetermined time period.

Although illustrated as part of the hardware virtualization service 120, the usage monitor service 124, the placement manager service 122, and the load balancing service 126 may be separate services executing on separate computer systems within the provider network 100 in communication with the hardware virtualization service 120. Further, although the placement manager service 122, the load balancing service 126, and the metering service 138 are described herein as obtaining resource usage metrics from the usage monitor service 124, in other embodiments, services 122, 126, and/or 136 obtain metrics from a data store 134 where the usage monitor service 124 stored calculated metrics or calculate metrics based on usage data in a data store 134 where the usage monitor service 124 stored the usage information reported from the usage monitor agents 154. The functions performed by the various services may be divided or combined amongst a smaller or larger number of services in other embodiments.

Figure 2:
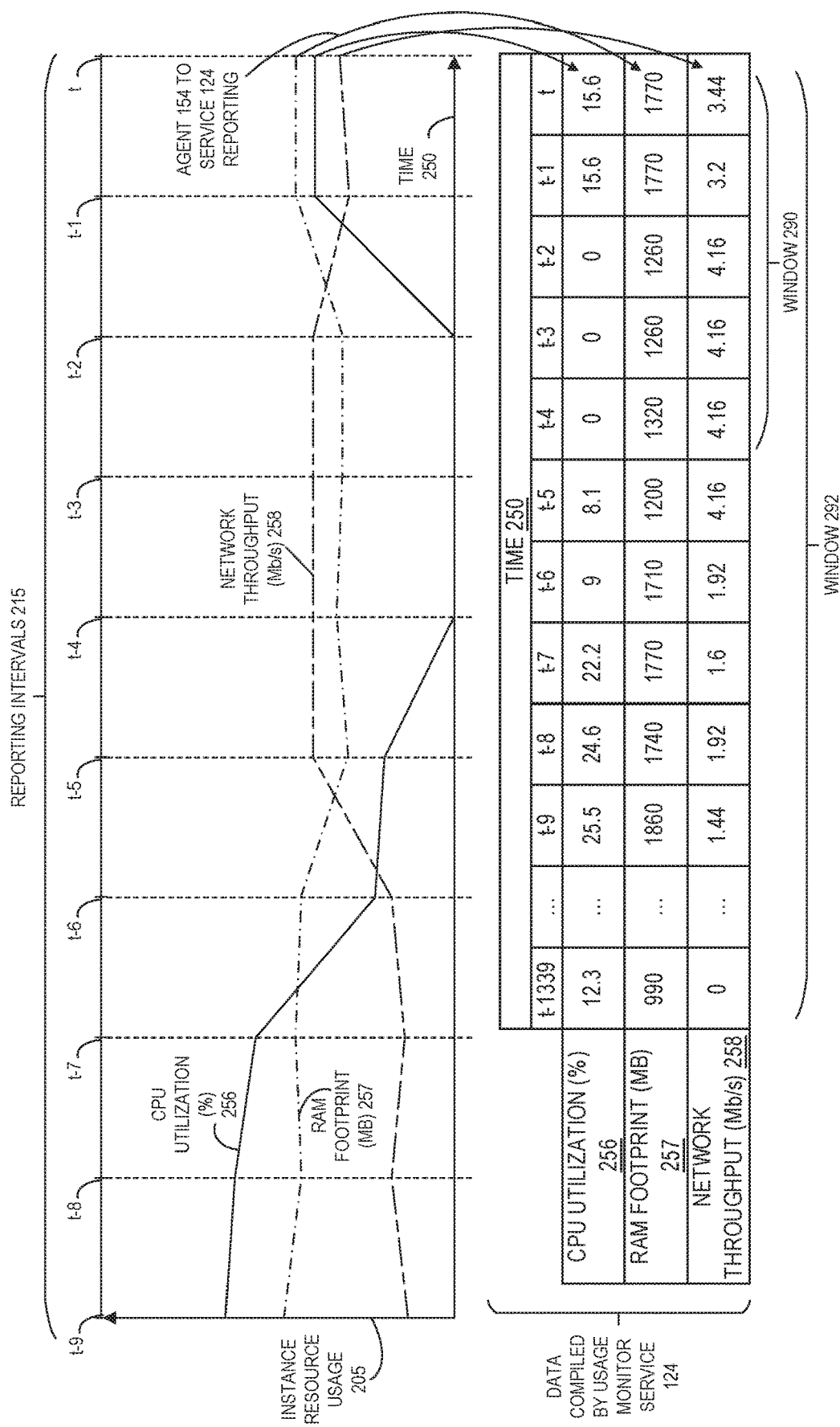
FIG. 2 is a diagram illustrating dynamically scalable compute instance resource usage monitoring according to some embodiments.

FIG. 2 is a diagram illustrating dynamically scalable compute instance resource usage monitoring according to some embodiments. In the upper portion of the illustration is a plot of an instance's resource usage 205 on the y-axis against time 250 on the x-axis. The plotted resources include CPU usage 256 as a percentage of CPU compute capacity, RAM usage 257 in megabytes (MB), and network usage 258 in megabits/second (Mb/s). As indicated above, the usage monitor agents 154 report resource usage to the usage monitor service 124 at some interval 215. The current reporting interval is marked t while prior reporting intervals are marked t−1, t−2, etc. In one embodiment, the usage monitor agents 154 report resource usage to the usage monitor service 124 approximately every 60 seconds. The lower portion of the illustration shows the data that the usage monitor service 124 compiles based on reported usage information from the usage monitor agents 154. As shown, the compiled data includes a value for the CPU usage 256, RAM usage 257, and network usage 258. Although illustrated for a single instance, the usage monitor service 124 builds a dataset that reflects the resource usage of each dynamically scalable compute instance 156 hosted by each computer system within the pool of instance-hosting computer systems 151. In some embodiments, the compiled dataset is indexed based on one or more of a customer identifier, a computer system identifier, an instance identifier, and/or a resource usage identifier.

The usage monitor service 124 processes the compiled data to generate one or more metrics. For example, the usage monitor service 124 may generate summary statistics related to the compute instance's resource usage over a given time period. Such summary statistics may include the mean, mode, weighted average (e.g., weighting newer reported usage information higher than older reported usage information), etc. For example, the usage monitor service 124 may generate summary statistics over one or more windows of reported usage information. In one embodiment, the usage monitor service 124 generates a per-instance average resource usage over window 290 based on the five-most recent intervals (e.g., 5 minutes) and a per-instance average resource usage over window 292 based on the 1440-most recent intervals (e.g., 1 day). In some embodiments, the usage monitor service 124 generates per-computer system summary statistics (e.g., based on the total reported usage of each compute instance hosted by a particular computer system). In some embodiments, the usage monitor service 124 generates per-customer summary statistics (e.g., based on the total reported usage of each of a customer's compute instances hosted within the pool of instance-hosting computer systems 151). In some embodiments, the usage monitor service 124 generates histograms that reflect the per-instance or per-computer system resource usage over time (e.g., average usage from 12 am to 1 am, 1 am to 2 am, etc. for a 24-hour cycle).

In embodiments where the compute instances 156 are executing using the same physical computing resources (e.g., CPU, RAM, etc.) of a computer system 151 as the virtualization management software (e.g., hypervisor, VMM, host OS), the usage monitor service 124 may incorporate the reported resource usage of the virtualization management software in per-computer system metric calculations.

In some embodiments, the usage monitor service 124 sends the generated metrics (and, optionally, corresponding resource, instance, computer system, and/or customer identifiers) to other services of the provider network 100. For example, the usage monitor service 124 includes an API that other services (e.g., services 122, 126, and/or 136) can query to cause the usage monitor service 124 to send metrics. Query parameters may include one or more of an instance identifier, a computer system identifier, a customer identifier, a resource usage identifier, a time period, a summary identifier (e.g., whether to use an average, weighted average, etc. when calculating a metric), or other parameters to retrieve usage information or summary statistics. For example, a service can issue an API call that includes a customer identifier and time period to query the usage monitor service 124 for summary statistics related to a customer's compute instances. As another example, a service can issue an API call that includes a computer system identifier, time period, and average identifier to query the usage monitor service 124 for the resource usage information of each compute instance averaged across the specified time period.

Figure 3:
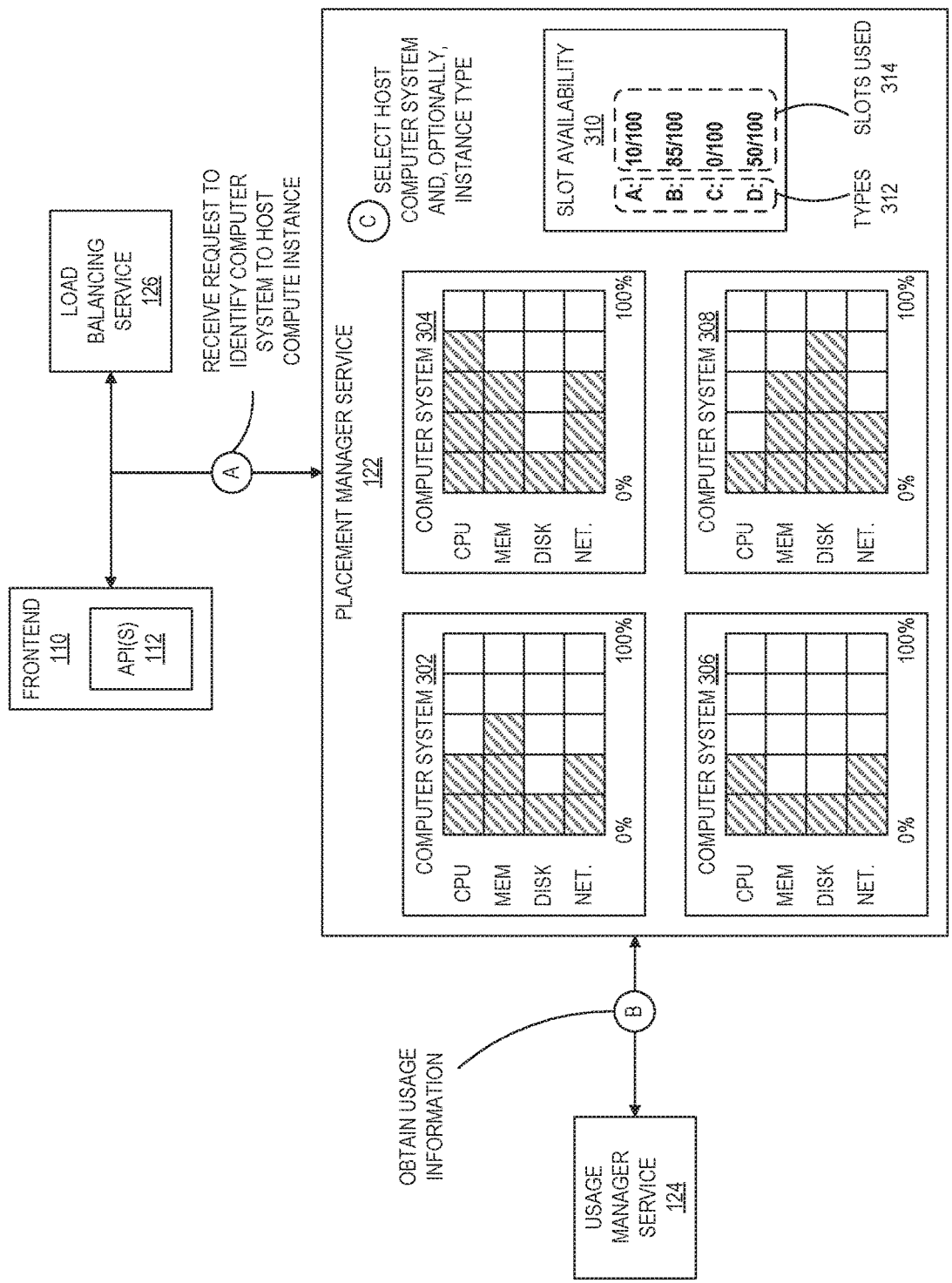
FIG. 3 is a diagram illustrating dynamically scalable compute instance placement according to some embodiments.

FIG. 3 is a diagram illustrating dynamically scalable compute instance placement according to some embodiments. As indicated at circle A, the placement manager service 122 receives a request to identify a computer system to host a compute instance from, for example, the frontend 110 or the load balancing service 126. The identified computer system 151 will be used to host a new compute instance (e.g., in the case of a new launch) or a moving compute instance (e.g., in the case of load balancing). As indicated at circle B, the placement manager service 122 obtains usage information from the usage monitor service 124 to determine the state of resource usage of instance-hosting computer systems 151. In the illustrated example, the placement manager service 122 obtains usage metrics for the CPU, memory, disk, and network of four computer systems 302, 304, 306, and 308. The usage metrics are graphically illustrated on a scale of 0 to 100% based on the total usage of each resource by the instances hosted on the respective computer system for some period of time (e.g., the past 5 minutes, 1 hour, 1 day, etc.). At circle C, the placement manager service 122 selects a computer system to host the new or moving compute instance. For example, the placement manager service 122 may select computer system 306 based on its overall low resource usage over the previous period of time. Once the placement manager service 122 has selected a computer system, the placement manager service 122 may return the selection to the requestor or to the hardware virtualization service 120 to proceed with the launch or migration of the compute instance.

In some embodiments, the placement manager service 122 selects a computer system to host a new dynamically scalable compute instance based on a threshold. For example, the threshold may be a static threshold that relates to the amount of unused (or overhead) performance relative to the maximum performance of the computer system (e.g., less than 80% total CPU utilization). As another example, the threshold may be a dynamic threshold that relates to the amount of unused performance of each computer system relative to the other instance-hosting computer systems which host instances (e.g., selects a computer system in the top 5% of computer systems as measured by the amount of performance overhead).

In some embodiments, the placement manager service 122 forecasts the resource usage per-computer system based on the prior resource usage of the compute instances on the computer system and makes the computer system selection based on the forecasted resource usage. For example, the placement manager service 122 may forecast the resource utilization of a given computer system for the next 24-hour period based on the average resource utilization of the computer system over the previous 24-hour period. In some embodiments, if the instances being hosted by a computer system have not changed during the prior reported usage period used to forecast usage, the placement manager service 122 may obtain the per-resource average usage associated with the computer system from the usage monitor service 124. If the instances being hosted by a computer system have changed during the prior reported usage period used to forecast usage, the placement manager service 122 may obtain per-instance metrics associated with the identities of compute instances currently hosted on the computer system (which may reflect compute instance usage information from periods hosted on other computer systems) and extrapolate the forecast based on the per-instance metrics.

In some embodiments, the placement manager service 122 may use estimated or actual resource usage metrics associated with the new or moving dynamically scalable compute instance when selecting a computer system. For example, when the request is to identify a computer system to host a new compute instance without a usage history, the placement manager service 122 may use one or more metrics representing the average resource usage of other dynamically scalable compute instances owned by the same customer. Alternatively, if the request is to identify a computer system to host a moving compute instance, the placement manager service 122 may use that compute instance's historical usage information in selecting a new computer system. The placement manager service 122 may obtain the historical usage information for a given period of time from the load balancing service 126 or the usage monitor service 124).

In selecting a computer system to host a new or moving dynamically scalable compute instance, the placement manager service 122 may score the computer systems 151 based on weights determined based on the historical (or estimated) usage of the compute instance being launched or moved. For example, if the placement manager service 122 is launching a new instance and the associated customer's other compute instances exhibit high CPU usage relative to other resources, the placement manager service 122 may increase the importance of CPU overhead when evaluating candidate computer systems to host the new instance (e.g., selecting computer system 308 based on the approximate 80% unused CPU overhead).

In some embodiments, some computer systems 151 may host a first type of dynamically scalable compute instance, other computer systems 151 may host a second type of dynamically scalable compute instance, and some other computer systems 151 may host either the first type or the second type of dynamically scalable compute instances. To handle different computer-system capabilities and dynamically scalable compute instance type-requirements, the placement manager service 122 maintains or obtains a state of the available instance types that are hosted (or can be hosted) within the pool of instance-hosting computer systems 151. The overall capacity of instance hosting by computer systems 151 is illustrated as slot availability 310 that includes three dynamically scalable compute instance types: A, B, C, and D. The types may vary based on the baseline performance level and the maximum performance level offered by the instances. The placement manager service 122 may limit the set of candidate computer systems that the placement manager service 122 evaluates by filtering out those that cannot support the new or moving compute instance type.

In some embodiments, the customer can launch a "typeless" dynamically scalable compute instance that allows the provider network to determine the baseline performance level and maximum performance level by dynamically moving the compute instance amongst instance types. In some embodiments, the placement manager service 122 determines the dynamically scalable compute instance type. For example, the placement manager service 122 may default all new typeless launches to a default dynamically scalable compute instance type. As another example, when the placement manager service 122 receives a request to identify a computer system to host a new or moving typeless dynamically scalable compute instance, the placement manager service 122 can evaluate the historical (or estimated) usage of the compute instance and/or the slot availability 310 in addition to the usage information of candidate computer systems. If number of slots used 314 for a particular type are running low (e.g., type B at 85/100 slots used), the placement manager service 122 can eliminate computer systems that only host type B instances from consideration when selecting a computer system. As another example, if the historical usage of a moving compute instance indicates the compute instance has been operating at or near the maximum performance level on a given type of dynamically scalable compute instance (e.g., at or above 90% of the maximum performance level), the placement manager service 122 can eliminate computer systems that can only host instances offering the same or a lower maximum performance level from consideration when selecting a computer system. Likewise, if the historical usage of a moving compute instance indicates the compute instance has been operating below the baseline performance level on a given type of dynamically scalable compute instance (e.g., at or below 20% of the baseline performance level), the placement manager service 122 can eliminate computer systems that can only host instances offering the same or a higher baseline performance level from consideration when selecting a computer system.

In some embodiments, the placement manager service 122 identifies a set of computer systems and randomly selects one of the computer systems in the set to host the new or moving compute instance. For example, the placement manager service 122 may identify the top-2 computer systems based on available resource overhead (e.g., computer system 302 and 306, assuming computer systems 302, 304, 306, and 308 offer similar levels of overall performance). The placement manager service 122 then randomly selects one of the instances. By randomizing the selection, the placement manager service 122 avoids situations where an instance may bounce between two instance-hosting computer systems 151 during load balancing.

Figure 4:
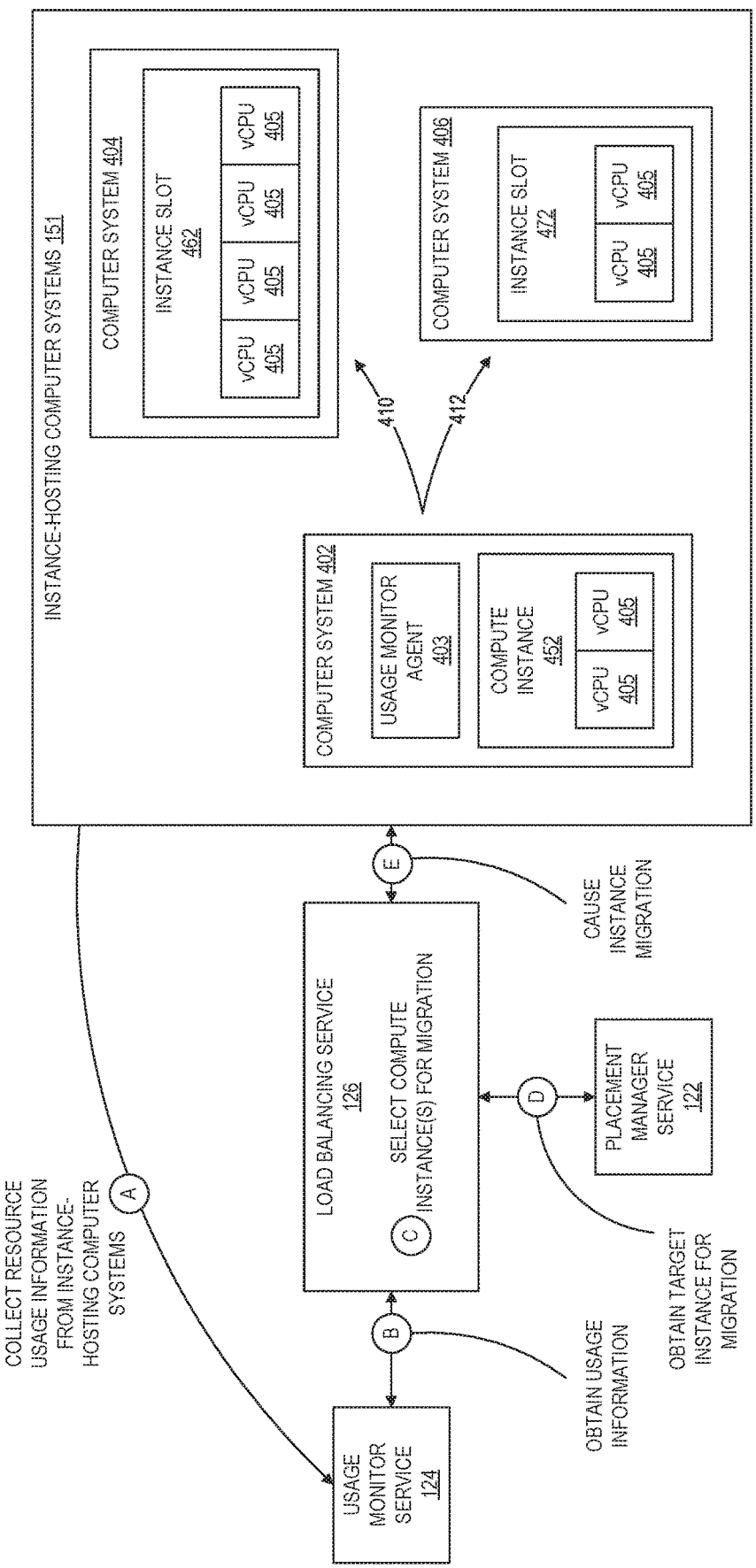
FIG. 4 is a diagram illustrating dynamically scalable compute instance load balancing according to some embodiments.

FIG. 4 is a diagram illustrating dynamically scalable compute instance load balancing according to some embodiments. As indicated at circle A, the usage monitor agents, including usage monitor agent 403, report resource usage information of the instance-hosting computer systems 151, including computer system 402, to the usage monitor service 124. At circle B, the load balancing service 126 obtains usage information from the usage monitor service 124. For example, the load balancing service 126 obtains total resource usage information of one or more resources (e.g., CPU utilization) of each computer system within a pool of instance-hosting computer systems 151, including of computer system 402. As another example, the load balancing service 126 obtains per-instance resource usage information of one or more resources (e.g., CPU utilization) of each computer system within a pool of instance-hosting computer systems 151.

At circle C, the load balancing service 126 selects one or more compute instances for migration. In one embodiment, the load balancing service 126 selects instances for migration first by evaluating the total resource usage by compute instances of computer systems against the corresponding maximum performance of the computer system to identify one or more computer systems as the source(s) of compute instance migration. For example, if a given computer system is hosting three compute instances and two compute instance's resource usage indicate 25% CPU utilization and the third compute instance's resource usage indicates 50% utilization, the computer system is operating at or near its maximum performance. Once the load balancing service 126 has identified one or more source computer systems for instance migration, the load balancing service 126 then identifies one or more compute instances hosted by the source computer systems for migration. Again, in some embodiments, the load balancing service 126 may identify compute instances for migration by selecting the top compute instance(s) based on resource usage information. In this example, the load balancing service 126 selects compute instance 452 for migration.

In some embodiments, the load balancing service 126 selects an instance or instances for migration based on one or more thresholds. The threshold(s) may be used to select the computer systems from which to migrate instances and the instances for migration. For example, the load balancing service 126 may select each instance using more than 80% of its associated maximum performance level. The load balancing service 126 may limit those instances to those operating on computer systems with less than 10% performance overhead relative to the maximum performance of the computer system. As another example, the load balancing service 126 may select the top N computer systems based on a threshold, the threshold based on each instance-hosting computer system's total usage of a given resource (or resources) by each hosted instance relative to the maximum resource performance of the resource offered by the computer system. For example, if the memory usage of a group of five instance-hosting computer systems is 40%, 80%, 90%, 75%, and 50% of the total memory of each respective computer system, the load balancing service may select the top 2 instance-hosting computer systems where the threshold is at or above 80% (based on the last reporting interval). The load balancing service 126 then selects M compute instances on each of the selected computer systems for migration relative to the resource usage of other instances hosted on the computer systems. The selected M compute instances may be those instances consuming the highest, the lowest, or some range within the median amount of resource consumption of the resource or resources running low on the computer system. Continuing the previous example, if the computer system with 90% memory usage includes 32 gigabytes (GB) of memory and hosts sixteen instances, the load balancing service 126 may select the instance (M=1) with the highest memory usage, the lowest memory usage, or the instance with the memory usage nearest the median of all sixteen instances.

At circle D, the load balancing service sends a request to the placement manager service 122 to obtain an identity of a new computer system to be used as the destination computer system in the migration process. The selection of a computer system to host the compute instance being migrated is described above with reference to FIG. 3. The request may include an identifier of the compute instance being migrated so the placement manager service 122 can obtain prior usage information associated with the compute instance as part of the selection process. In this example, the placement manager service 122 may select computer system 406 having instance slot 472 as the destination computer system for the migration of compute instance 452. At circle E, the load balancing service 126 causes the selected compute instance(s) to migrate from the source computer system to the computer system selected by the placement manager service 122, as indicated by arrow 412. In some embodiments, the hardware virtualization service 120 (or another service) manages the migration of compute instances. For example, the hardware virtualization service 120 may launch an instance on the destination computer system, copy over the state of the instance being migrated from the source computer system to the destination computer system, and re-route traffic destined for the source computer system to the destination computer system.

In some embodiments, the load balancing service 126 periodically repeats the process of obtaining resource usage information from the usage monitor service 124 and causing one or more instance migrations (e.g., every 5 minutes) to optimize the distribution of the workload of the dynamically scalable compute instances hosted by the instance-hosting computer systems 151. By periodically re-evaluating the total resource usage of instances on a per-computer system basis, the load balancing service 126 proactively moves instances away from computer systems nearing a point where an instance could not operate at its associated maximum performance level for a given resource. In this manner, the load balancing service 126 facilitates each dynamically scalable instance operating up to its associated maximum performance level for a given resource.

In some embodiments, the instance identified for migration may be a typeless dynamically scalable compute instance. In such cases, the placement manager service 122 may identify computer system 404 having instance slot 462 as the migration destination when the resource usage information of compute instance 452 indicates it is operating at or near its maximum performance level on the 2-vCPU instance type. The load balancing service 126 causes the migration, as indicated by arrow 410. Post-migration, compute instance 452 has an increased maximum performance level (i.e., 4 vCPUs versus 2 vCPUs).

In embodiments that include typeless dynamically scalable compute instances, the load balancing service 126 may periodically identify one or more compute instances operating at the lowest resource usage level relative to the baseline performance level offered by the dynamically scalable instance type on which the instance is currently placed. The load balancing service 126 can send a request to the placement manager service 122 to obtain an identity of a new computer system to be used as the destination computer system in migrating the low-usage typeless compute instance. By doing so, the load balancing service 126 frees up higher performance slots for placement of other instances.

Figure 5:
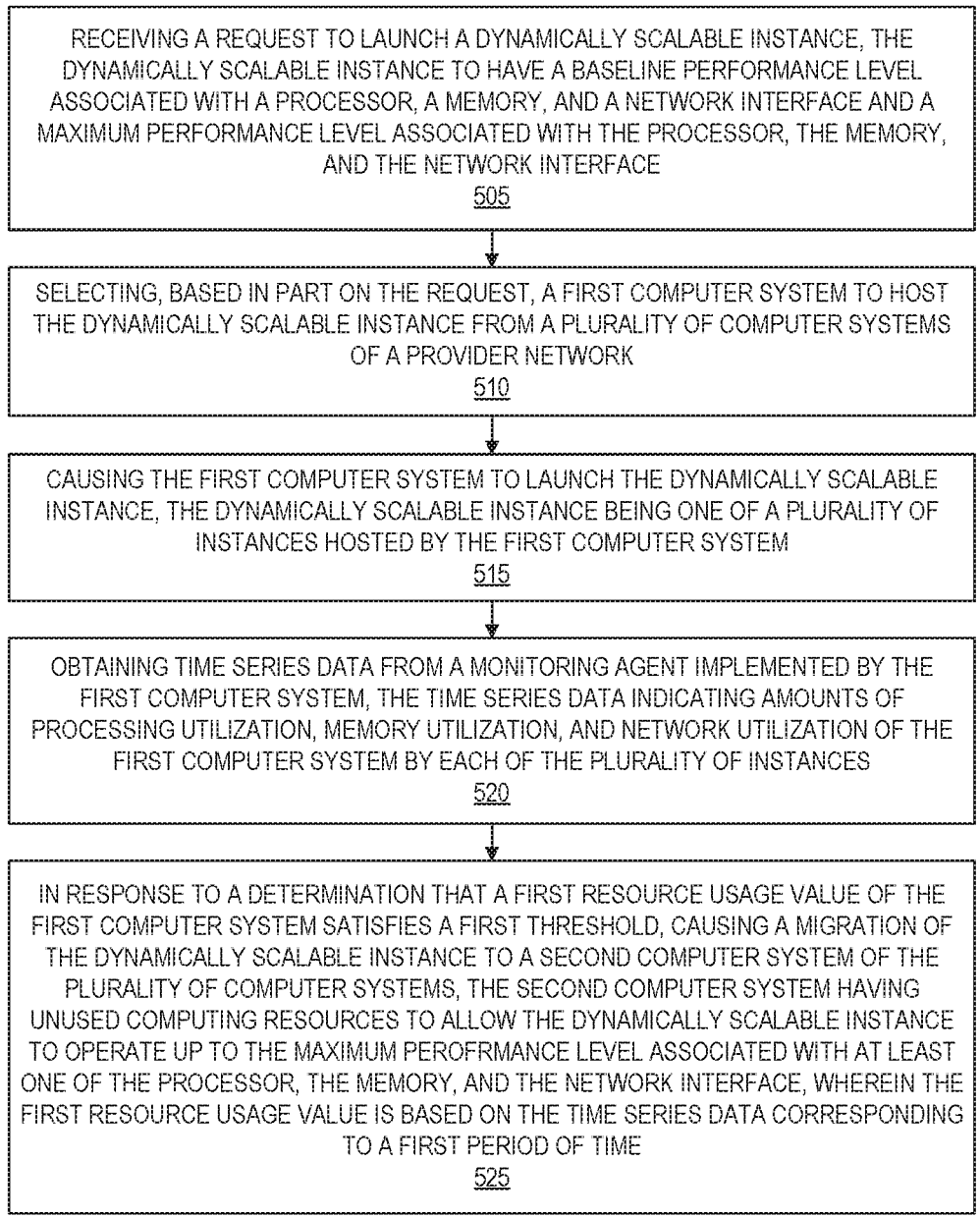
FIG. 5 is a flow diagram illustrating operations of a method for managing dynamically scalable compute instances according to some embodiments.

FIG. 5 is a flow diagram illustrating operations of a method for managing dynamically scalable compute instances according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by the placement manager service 122, usage monitor service 124, and/or the load balancing service 126 of the other figures.

The operations 500 include, at block 505, receiving a request to launch a dynamically scalable instance, the dynamically scalable instance to have a baseline performance level associated with a processor, a memory, and a network interface and a maximum performance level associated with the processor, the memory, and the network interface. For example, a customer may send a request to launch a new dynamically scalable compute instance within the provider network 100. The frontend 110 may receive the request and transmit one or more indications to other services of the provider network, such as the hardware virtualization service 120 and the placement manager service 122.

In some embodiments, the compute instance being launched is of a typeless dynamically scalable compute instance. In such cases, the initial selection of a dynamically scalable compute instance type is handled by the provider network 100. If the customer specified a dynamically scalable instance type in the launch request, operations 500 continue to block 510. Otherwise, an instance type is selected. As described above with reference to FIG. 3, the placement manager service 122 may select a default instance type for all typeless launches or may consider the state of available slots of dynamically scalable instance types and select a dynamically scalable instance type with available hosting capacity in the provider network.

The operations 500 include, at block 510, selecting, based in part on the request, a first computer system to host the dynamically scalable instance from a plurality of computer systems of a provider network. As described above with reference to FIG. 3, the placement manager service 122 may evaluate the state of resource usage of instance-hosting computer systems 151 and, optionally, available slots for specified instance types to select a computer system to host instance being launched. Once a host computer system is selected, the operations 500 include, at block 515, causing the first computer system to launch the dynamically scalable instance, the dynamically scalable instance being one of a plurality of instances hosted by the first computer system.

The operations 500 include, at block 520, obtaining time series data from a monitoring agent implemented by the first computer system, the time series data indicating amounts of processing utilization, memory utilization, and network utilization of the first computer system by each of the plurality of instances. As described herein, a usage monitor service 124 obtains resource usage information from usage monitor agents 154 implemented by the various instance-hosting computer systems 151. The time series data may be reported in intervals from the usage monitor agents 154 to the usage monitor service 124 and represent the usage of various compute resources of the computer systems 151 by the hosted compute instances 156 (e.g., CPU utilization, memory footprint, network bandwidth, etc.). In some embodiments, the usage monitor service 124 generates one or more metrics for use in the management of the dynamically scalable compute instances hosted by the provider network. Exemplary metrics include summary statistics that reflect the resource usage of instances over certain windows (e.g., minutes, hours, days, etc.). For example, the usage monitor service 124 may calculate the average computing resource utilization over the last 5 minutes, where a computing resource is a central processing unit (CPU), a CPU core, a virtual CPU, a memory, or a network interface.

The operations 500 include, at block 525, in response to a determination that a first resource usage value of the first computer system satisfies a first threshold, causing a migration of the dynamically scalable instance to a second computer system of the plurality of computer systems, the second computer system having unused computing resources to allow the dynamically scalable instance to operate up to the maximum performance level associated with at least one of the processor, the memory, and the network interface, wherein the first resource usage value is based on the time series data corresponding to a first period of time. As described above with reference to FIG. 4, the load balancing service 126 periodically evaluates the per-computer system 151 resource usage to distribute the workload of the dynamically scalable compute instances across the pool of instance-hosting computer systems 151. For example, the load balancing service 126 may, based on one or more thresholds, identify a set of computer systems 151 with the lowest amount of free resources or overhead and then select one or more instances from the identified set of computer systems for migration. The load balancing service 126 may consult the placement manager service 122 to identify a destination computer system to host a migrating instance. Thus, after identifying a compute instance for migration, the load balancing service 126 may request a selection of a computer system as a migration destination from the placement manager service 122, as described elsewhere herein.

Figure 6:
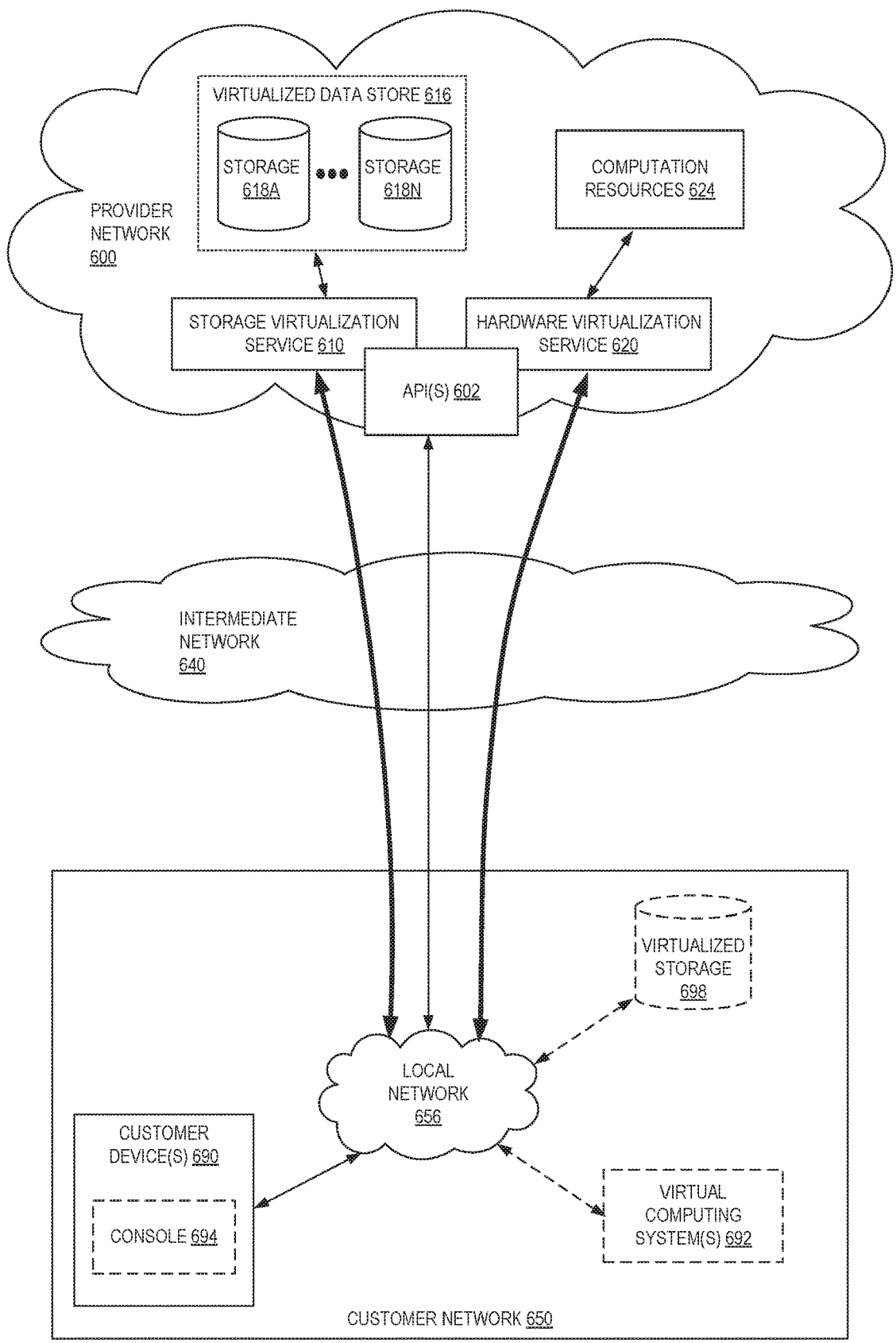
FIG. 6 is a block diagram of an example provider network that provides a storage service and a hardware virtualization service to customers according to some embodiments.

FIG. 6 is a block diagram of an example provider network that provides a storage service and a hardware virtualization service to customers, according to some embodiments. Hardware virtualization service 620 provides multiple computation resources 624 (e.g., compute instances) to customers. The computation resources 624 may, for example, be rented or leased to customers of the provider network 600 (e.g., to a customer that implements customer network 650). Each computation resource 624 may be provided with one or more local IP addresses. Provider network 600 may be configured to route packets from the local IP addresses of the computation resources 624 to public Internet destinations, and from public Internet sources to the local IP addresses of computation resources 624.

Provider network 600 may provide a customer network 650, for example coupled to intermediate network 640 via local network 656, the ability to implement virtual computing systems 692 via hardware virtualization service 620 coupled to intermediate network 640 and to provider network 600. In some embodiments, hardware virtualization service 620 may provide one or more APIs 602, for example a web services interface, via which a customer network 650 may access functionality provided by the hardware virtualization service 620, for example via a console 694 (e.g., a web-based application, standalone application, mobile application, etc.). In some embodiments, at the provider network 600, each virtual computing system 692 at customer network 650 may correspond to a computation resource 624 that is leased, rented, or otherwise provided to customer network 650.

From an instance of a virtual computing system 692 and/or another customer device 690 (e.g., via console 694), the customer may access the functionality of storage service 610, for example via one or more APIs 602, to access data from and store data to storage resources 618A-618N of a virtual data store 616 (e.g., a folder or "bucket", a virtualized volume, a database, etc.) provided by the provider network 600. In some embodiments, a virtualized data store gateway (not shown) may be provided at the customer network 650 that may locally cache at least some data, for example frequently-accessed or critical data, and that may communicate with storage service 610 via one or more communications channels to upload new or modified data from a local cache so that the primary store of data (virtualized data store 616) is maintained. In some embodiments, a user, via a virtual computing system 692 and/or on another customer device 690, may mount and access virtual data store 616 volumes via storage service 610 acting as a storage virtualization service, and these volumes may appear to the user as local (virtualized) storage 698.

While not shown in FIG. 6, the virtualization service(s) may also be accessed from resource instances within the provider network 600 via API(s) 602. For example, a customer, appliance service provider, or other entity may access a virtualization service from within a respective virtual network on the provider network 600 via an API 602 to request allocation of one or more resource instances within the virtual network or within another virtual network.

Figure 7:
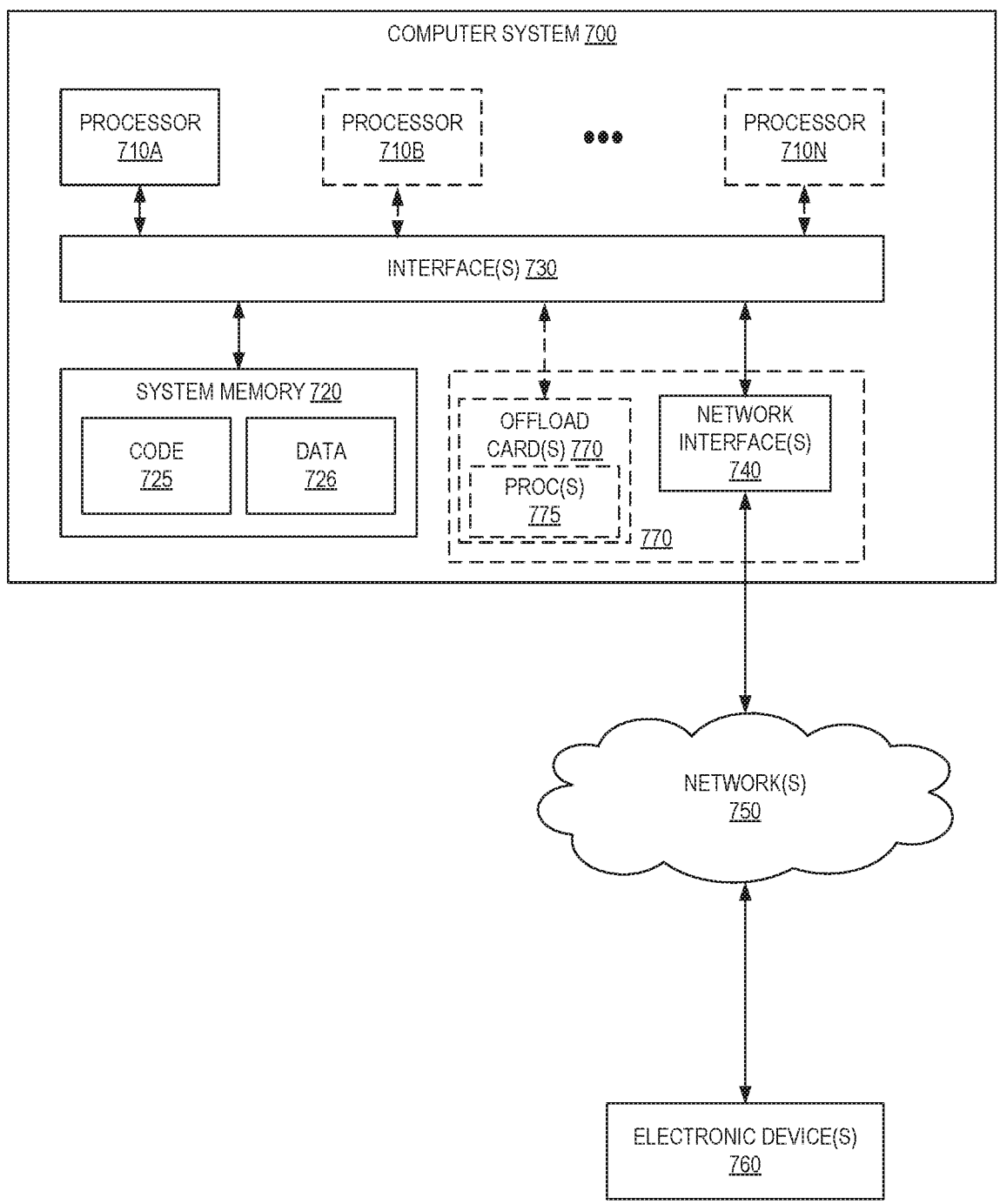
FIG. 7 is a block diagram illustrating an example computer system that may be used in some embodiments.

In some embodiments, a system that implements a portion or all of the techniques for managing usage of computer system resources in a provider network as described herein may include a general-purpose computer system that includes or is configured to access one or more computer-accessible media, such as computer system 700 illustrated in FIG. 7. In the illustrated embodiment, computer system 700 includes one or more processors 710 coupled to a system memory 720 via an input/output (I/O) interface 730. Computer system 700 further includes a network interface 740 coupled to I/O interface 730. While FIG. 7 shows computer system 700 as a single computing device, in various embodiments a computer system 700 may include one computing device or any number of computing devices configured to work together as a single computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 710 may commonly, but not necessarily, implement the same ISA.

System memory 720 may store instructions and data accessible by processor(s) 710. In various embodiments, system memory 720 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 720 as code 725 and data 726.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices 760 attached to a network or networks 750, such as other computer systems or devices as illustrated in FIG. 1, for example. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 700 includes one or more offload cards 770 (including one or more processors 775, and possibly including the one or more network interfaces 740) that are connected using an I/O interface 730 (e.g., a bus implementing a version of the PCIe standard, or another interconnect such as a QuickPath interconnect (QPI) or UltraPath interconnect (UPI)). For example, in some embodiments the computer system 700 may act as a host electronic device (e.g., operating as part of a hardware virtualization service) that hosts compute instances, and the one or more offload cards 770 execute a virtualization manager that can manage compute instances that execute on the host electronic device. As an example, in some embodiments the offload card(s) 770 can perform compute instance management operations such as pausing and/or un-pausing compute instances, launching and/or terminating compute instances, performing memory transfer/copying operations, etc. These management operations may, in some embodiments, be performed by the offload card(s) 770 in coordination with a hypervisor (e.g., upon a request from a hypervisor) that is executed by the other processors 710A-710N of the computer system 700. However, in some embodiments the virtualization manager implemented by the offload card(s) 770 can accommodate requests from other entities (e.g., from compute instances themselves), and may not coordinate with (or service) any separate hypervisor.

In some embodiments, system memory 720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 700 via I/O interface 730. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 156-1 to 156-N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:

receiving a request to launch a dynamically scalable instance, the dynamically scalable instance to have a baseline performance level associated with a processor, a memory, and a network interface and a maximum performance level associated with the processor, the memory, and the network interface;

selecting, based in part on the request, a first computer system to host the dynamically scalable instance from a plurality of computer systems of a provider network;

causing the first computer system to launch the dynamically scalable instance, the dynamically scalable instance being one of a plurality of instances hosted by the first computer system;

obtaining time series data from a monitoring agent implemented by the first computer system, the time series data indicating amounts of processing utilization, memory utilization, and network utilization of the first computer system by each of the plurality of instances; and in response to a determination that a first resource usage value of the first computer system satisfies a first threshold, causing a migration of the dynamically scalable instance to a second computer system of the plurality of computer systems, the second computer system having unused computing resources to allow the dynamically scalable instance to operate up to the maximum performance level associated with at least one of the processor, the memory, and the network interface, wherein the first resource usage value is based on the time series data corresponding to a first period of time.

2. The computer-implemented method of claim 1, wherein the first threshold is based on a resource usage of each of the plurality of computer systems of the provider network.

3. The computer-implemented method of claim 1, wherein the selecting the first computer system is further based on a determination that a second resource usage of the first computer system satisfies a second threshold, the second resource usage based on the time series data corresponding to a second period of time for each of the plurality of instances other than the dynamically scalable instance, the second period of time including an earlier time than the first period of time.

4. The computer-implemented method of claim 1, wherein the time series data further indicates an amount of computing resource utilization of the first computer system by a hypervisor.

5. The computer-implemented method of claim 1, wherein the dynamically scalable instance executes using N virtual central processing units on the first computer system and M virtual central processing units on the second computer system, where N does not equal M.

6. The computer-implemented method of claim 1, wherein the first resource usage value is based on an average of at least a portion of the time series data over the first period of time.

7. The computer-implemented method of claim 1, wherein the first computer system includes a software environment that includes the monitoring agent, a hypervisor, and the plurality of compute instances.

8. A system comprising:
- a host computer system coupled to a provider network, the host computer system to implement a monitoring agent and to host a plurality of instances; and
- a set of hardware virtualization services implemented by a plurality of computer systems coupled to the provider network, the set of hardware virtualization services including instructions that upon execution cause the plurality of computer systems to:
  - receive a request to launch a dynamically scalable instance, the dynamically scalable instance to have a baseline performance level associated with a processor, a memory, and a network interface and a maximum performance level associated with the processor, the memory, and the network interface;
  - select, based in part on the request, the host computer system to host the dynamically scalable instance from a plurality of host computer systems coupled to the provider network;
  - cause the host computer system to launch the dynamically scalable instance, the dynamically scalable instance being one of the plurality of instances hosted by the host computer system;
  - obtain time series data from the monitoring agent implemented by the host computer system, the time series data indicating amounts of processing utilization, memory utilization, and network utilization of the host computer system by each of the plurality of instances; and
  - in response to a determination that a first resource usage value of the host computer system satisfies a first threshold, cause a migration of the dynamically scalable instance to a second host computer system of the plurality of host computer systems, the second host computer system having unused computing resources to allow the dynamically scalable instance to operate up to the maximum performance level associated with at least one of the processor, the memory, and the network interface, wherein the first resource usage value is based on the time series data corresponding to a first period of time.

9. The system of claim 8, wherein the first threshold is based on a resource usage of each of the plurality of host computer systems.

10. The system of claim 8, wherein to select the host computer system is further based on a determination that a second resource usage of the host computer system satisfies a second threshold, the second resource usage based on the time series data corresponding to a second period of time for each of the plurality of instances other than the dynamically scalable instance, the second period of time including an earlier time than the first period of time.

11. The system of claim 8, wherein the time series data further indicates an amount of computing resource utilization of the host computer system by a hypervisor.

12. The system of claim 8, wherein the dynamically scalable instance executes using N virtual central processing units on the host computer system and M virtual central processing units on the second host computer system, where N does not equal M.

13. The system of claim 8, wherein the first resource usage value is based on an average of at least a portion of the time series data over the first period of time.

14. The system of claim 8, wherein the host computer system includes a software environment that includes the monitoring agent, a hypervisor, and the plurality of compute instances.

15. A non-transitory computer-readable storage medium storing instructions which when executed by one or more processors of a computing device cause the computing device to perform operations comprising:
- receiving a request to launch a dynamically scalable instance, the dynamically scalable instance to have a baseline performance level associated with a processor, a memory, and a network interface and a maximum performance level associated with the processor, the memory, and the network interface;
- selecting, based in part on the request, a first computer system to host the dynamically scalable instance from a plurality of computer systems of a provider network;
- causing the first computer system to launch the dynamically scalable instance, the dynamically scalable instance being one of a plurality of instances hosted by the first computer system;
- obtaining time series data from a monitoring agent implemented by the first computer system, the time series data indicating amounts of processing utilization, memory utilization, and network utilization of the first computer system by each of the plurality of instances; and
- in response to a determination that a first resource usage value of the first computer system satisfies a first threshold, causing a migration of the dynamically scalable instance to a second computer system of the plurality of computer systems, the second computer system having unused computing resources to allow the dynamically scalable instance to operate up to the maximum performance level associated with at least one of the processor, the memory, and the network interface, wherein the first resource usage value is based on the time series data corresponding to a first period of time.

16. The non-transitory computer-readable storage medium of claim 15, wherein the first threshold is based on a resource usage of each of the plurality of computer systems of the provider network.

17. The non-transitory computer-readable storage medium of claim 15, wherein the selecting the first computer system is further based on a determination that a second resource usage of the first computer system satisfies a second threshold, the second resource usage based on the time series data corresponding to a second period of time for each of the plurality of instances other than the dynamically scalable instance, the second period of time including an earlier time than the first period of time.

18. The non-transitory computer-readable storage medium of claim 15, wherein the time series data further indicates an amount of computing resource utilization of the first computer system by a hypervisor.

19. The non-transitory computer-readable storage medium of claim 15, wherein the dynamically scalable instance executes using N virtual central processing units on the first computer system and M virtual central processing units on the second computer system, where N does not equal M.

20. The non-transitory computer-readable storage medium of claim 15, wherein the first resource usage value is based on an average of at least a portion of the time series data over the first period of time.

\* \* \* \* \*